(12) United States Patent
Kiriakidis et al.

(10) Patent No.: US 12,453,959 B2
(45) Date of Patent: Oct. 28, 2025

(54) PHOTOCATALYTIC TITANIUM DIOXIDE WITH MULTI-ELEMENT IMPURITIES AND PRODUCTION METHOD

(71) Applicant: PCN Materials IKE, Anopolis (GR)

(72) Inventors: George Kiriakidis, Heraklion (GR); Binas Vassilios, Heraklion (GR)

(73) Assignee: PCN MATERIALS IKE, Anopolis (GR)

( * ) Notice: Subject to any disclaimer, the term of this patent is extended or adjusted under 35 U.S.C. 154(b) by 502 days.

(21) Appl. No.: 17/995,289

(22) PCT Filed: May 16, 2020

(86) PCT No.: PCT/IB2020/054658
§ 371 (c)(1),
(2) Date: Sep. 30, 2022

(87) PCT Pub. No.: WO2021/198748
PCT Pub. Date: Oct. 7, 2021

(65) Prior Publication Data
US 2023/0149904 A1    May 18, 2023

(30) Foreign Application Priority Data
Apr. 3, 2020  (GR) .............................. 20200100173

(51) Int. Cl.
*B01J 21/06*    (2006.01)
*B01J 23/75*    (2006.01)
(Continued)

(52) U.S. Cl.
CPC ............. *B01J 21/063* (2013.01); *B01J 23/75* (2013.01); *B01J 35/39* (2024.01); *B01J 35/40* (2024.01);
(Continued)

(58) Field of Classification Search
CPC . B01J 21/063; B01J 35/39; B01J 35/40; B01J 23/75; B01J 37/0036; B01J 37/08; B01J 37/34
(Continued)

(56) References Cited

U.S. PATENT DOCUMENTS

| 5,759,948 A | * | 6/1998 | Takaoka | .................... B01J 35/39 502/325 |
|---|---|---|---|---|
| 7,138,357 B2 | * | 11/2006 | Karvinen | ................ B01J 21/063 502/223 |

(Continued)

FOREIGN PATENT DOCUMENTS

| CA | 2594857 A1 * | 8/2006 | ............. H01M 14/00 |
|---|---|---|---|
| CA | 3039505 A1 * | 4/2018 | ............. B01J 21/063 |

(Continued)

OTHER PUBLICATIONS

Benjwal et al. (2018) "1-D and 2-D morphology of metal cation co-doped (Zn, Mn) TiO2 and investigation of their photocatalytic activity" Applied Surface Science 427:262-272.
(Continued)

*Primary Examiner* — Patricia L. Hailey
(74) *Attorney, Agent, or Firm* — FisherBroyles, LLP; Cara L. Crowley-Weber; Gregory T. Fettig

(57) ABSTRACT

A photocatalyst consists of $TiO_2$ with impurities of metal elements from the d-block and the p-block of the periodic table. The method of production of the photocatalyst includes a) preparation of a mixture including titanium and elements or compounds, comprising at least one metal element or compound of a metal element of d-block, preferably manganese and a metal element or a compound of a metal element of the p-block, preferably aluminum, b) processing of the mixture and c) obtaining the photocatalyst containing $TiO_2$ with impurities of at least one metal element from the d-block and at least one metal element from the
(Continued)

p-block. When the photocatalyst is activated in the presence of solar radiation and inactivate bacteria resistant to antibiotics and microorganisms with different levels of resistance to stressful disinfection conditions, it removes degrading residual water resistance genes and decompose antibiotics from waste-water, effluent and other liquid wastes.

13 Claims, 11 Drawing Sheets

(51) Int. Cl.

| | | |
|---|---|---|
| *B01J 35/39* | (2024.01) | |
| *B01J 35/40* | (2024.01) | |
| *B01J 37/00* | (2006.01) | |
| *B01J 37/08* | (2006.01) | |
| *B01J 37/34* | (2006.01) | |

(52) U.S. Cl.
CPC ........... *B01J 37/0036* (2013.01); *B01J 37/08* (2013.01); *B01J 37/34* (2013.01)

(58) Field of Classification Search
USPC .................................. 502/324, 350; 516/90
See application file for complete search history.

(56) References Cited

U.S. PATENT DOCUMENTS

| | | | | |
|---|---|---|---|---|
| 7,521,394 | B2* | 4/2009 | Xie | B01J 35/45 977/773 |
| 7,846,864 | B2* | 12/2010 | Ham | B01J 35/39 210/683 |
| 10,155,220 | B2* | 12/2018 | Kashima | B01J 37/0209 |
| 2003/0181329 | A1* | 9/2003 | Tanaka | B01J 21/066 502/343 |
| 2007/0140952 | A1* | 6/2007 | Inoue | B01J 35/37 423/610 |
| 2007/0248790 | A1* | 10/2007 | Ogata | C03C 17/007 428/98 |
| 2009/0075093 | A1* | 3/2009 | Iversen | C11D 3/0063 526/341 |
| 2010/0197487 | A1* | 8/2010 | Eder | H01J 37/32009 502/350 |
| 2013/0180932 | A1 | 7/2013 | Fukumura et al. | |

FOREIGN PATENT DOCUMENTS

| | | | | |
|---|---|---|---|---|
| CN | 104 549 196 | | 4/2015 | |
| CN | 106 086 991 | | 12/2017 | |
| KR | 100444892 | B1 * | 8/2004 | ............... B01J 21/06 |
| WO | WO-2009017480 | A1 * | 2/2009 | ............. A61L 9/205 |
| WO | WO 2011/080304 | | 7/2011 | |
| WO | WO 2015/137511 | | 9/2015 | |

OTHER PUBLICATIONS

Franch et al. (2005) "Enhancement of photocatalytic activity of TiO2 by adsorbed aluminum (III)" Applied Catalysis B55(2): 105-113.

Karafas et al. (2018) "Effect of metal doped and co-doped TiO2 photocatalysts oriented to degrade indoor/outdoor pollutants for air quality improvement. A kinetic and product study using acetaldehyde as probe molecule" Journal of Photochemistry and Photobiology 371:255-236.

Si et al. (2019) "Humidity sensing behavior and its influence on the dielectric properties of (In + Nb) co-doped TiO2 ceramics" Journal of Material Science 54(24):14645-14653.

Yang et al. (2008) "One-step preparation of silver and indium oxide co-doped TiO2 photocatalyst for the degradation of rhodamine B" Catalysis Communications 9(6):1224-1229.

\* cited by examiner

PHOTOCATALYTIC TITANIUM DIOXIDE WITH MULTI-ELEMENT IMPURITIES AND PRODUCTION METHOD

This application is a National Stage Application of PCT/IB2020/054658, filed May 16, 2020, which claims the benefit of Greek Application No. GR20200100173 filed Apr. 3, 2020, the disclosures of which are hereby incorporated by reference in their entirety.

The present invention refers to a method of producing photocatalytic material and a photocatalytic material for use under artificial and/or natural sunlight. The invention also refers to photocatalytic redox reactions caused by UV and visible light.

Photocatalysis based on semiconductor materials follows a simple mechanism that involves a few steps. When light, with energy equal to at least the energy gap of a semiconductor is absorbed by a semiconductor, a number of electrons equal to the number of absorbed photons undergo a transition from the valence band to the conduction band leaving holes behind. Excited electrons in the conductivity zone and positive holes in the valence band undergo mobility, diffuse to the surface and become available for charge transfer. In such a way they become capable of initiating surface chemical reactions, usually through the production of strongly oxidizing radicals of hydroxyl and peroxide type. Photocatalytic activity depends on the type of radiation, the absorption properties of the particular semiconductor, the rate of electron-hole recombination, as well as the oxidation and reduction rates on the surface of the material.

Titanium dioxide ($TiO_2$) is considered one of the most effective and environmentally friendly photocatalyst due to its high chemical stability and is widely used to decompose various pollutants, both in liquid and gaseous phase (see e.g. EP-1 504 816 and US2002147108).

The publication of Jiang et al. ["Low-temperature selective catalytic reduction of NO on $MnO_x/TiO_2$ prepared by different methods", Journal of Hazardous Materials, Elsevier, Amsterdam, NL, vol. 162, no. 2-3, 15 Mar. 2009 (2009 Mar. 15), pages 1249-1254] refers to catalysts for catalytic reduction of nitrogen oxides at low temperatures and mainly concerns car catalysts. The document presents three methods of preparation of catalyst $MnO_x$—$TiO_2$: (i) a sol-gel solution method, with which $MnO_x$—$TiO_2$ is prepared by mixing titanium butyl, ethanol, water, acetic acid and nitric manganese to create a transparent yellow solution (section 2.1.1), (ii) a method of impregnation (section 2.1.2), and (iii) a method of condensation from a solution of nitric manganese and sulfate titanium, with the addition of an aqueous solution of ammonia (section 2.1.3). The catalysts prepared according to the methods of Jiang et al., were subjected to tests in conditions of flow of a gas at temperatures of 343 K to 523 K (section 2.2.).

US20022147108 (paragraphs & [0125]) describes a method for producing a photocatalyst by immersing titanium dioxide in a solution of nitrate manganese [Mn $(NO_3)_2$; $H_2O$], which includes (i) the receipt of the hydrated nitrate manganese, (ii) the provision of a mixture containing: a) the hydrated nitrate manganese, b) the titanium ions solution and c) the solution $(NH_4)_2TiF_6$, and (iii) the treatment of the mixture to be obtained a photocatalytic film-containing titanium dioxide ($TiO_2$) mixed with Mn, on a glass substrate.

The publication of Zhang L. et al ["$MnO_2$-doped anatase $TiO_2$—An excellent photocatalyst for degradation of organic contaminants in aqueous solution", Catalysis Communications, Elsevier Science, Amsterdam, NL, vol. 10, no. 10, 20 May 2009 (2009 May 20), pages 1414-1416, XP026093827, ISSN: 1566-736 7, 001:10.1016/J.CATCOM.2009.03.015A] presents a photocatalytic powder consisting of particles, the size of which are between 200 nm and 1200 nm and contain titanium dioxide and manganese dioxide compounds where the predominant crystal structure of the photocatalyst is anatase.

Patent GR 3 099 724 and the European application EP-2 519 348 describe a photocatalyst obtained by ingesting titanium dioxide in a manganese dioxide aqueous solution. To produce the photocatalyst, a mixture containing a) manganese dioxide hydrolysis, b) titanium solution and c) ammonia solution ($NH_3$) is processed.

The object of the invention is a photocatalytic material and a method for producing such a material with improved photocatalytic capacity when exposed to ultraviolet radiation by natural or artificial lighting. Another object of the invention is a photocatalytic material and a method for producing such a material with improved photocatalytic capacity when exposed to solar or technically visible radiation.

The invention is defined in the independent claims.

Dependent claims define additional features, which give further advantages to the invention The invention refers to a method of making a photocatalyst comprising titanium oxide and impurities of a metal element from the d-block of the periodic table and impurities of a metal element from the p-block of the periodic table. According to the invention, the photocatalytic method of production includes a) preparation of a mixture including titanium and elements or compounds, whereby the elements or compounds include at least one metal element or compound of a metal element of d-block of the periodic table, preferably manganese and a metal element or a compound of a metal element of the p-block of the periodic table, preferably aluminum, b) processing of the mixture after the addition of said elements or compounds and c) obtaining the photocatalyst containing titanium dioxide (titanium, $TiO_2$) with impurities of at least one metal element from the d-block of the periodic table and at least one metal element from the p-block of the periodic table.

The element from d-block of the periodic table can be added to a titanium-containing solution, through a solution e.g. manganese salt solution, acetic manganese solution, chromium solution, iron solution, etc. The element from the p-block of the periodic table may also be added to the titanium-containing solution through a solution e.g. aluminum salt solution, nitrite aluminum solution, indium solution, etc. Titanium can come from a variety of sources, e.g. titanium sulfate, titanium isopropoxide, titanium butoxide, etc. The element from d-block of the periodic table and the element of p-block added to the solution are selected depending on the use of the photocatalyst, e.g. the wavelength of the light, from which the element is activated and/or the element availability.

Indicatively, if the element of d-block is added to the mixture via a solution of this element or a compound thereof, the concentration of the element of d-block in its solution is in the range of 0.01 M or about 0.01 M to 10 M or about 10 M (M: mol/l) and preferably less than 0.1 M or about 0.1 M. In some cases the concentration is 0.1 M or about 0.1 M.

Respectively, if the element of p-block is added to the mixture via a solution of this element or a compound thereof, from the processing of which the photocatalyst is produced, the concentration of the element of p-block in its solution is in the range of 0.01 M or about 0.01 M to 10 M or about 10 M and preferably less than 0.1 M or about 0.1 M. In some cases the concentration is 0.1 M or about 0.1 M.

The mixture containing titanium, an element of d-block and an element of p-block, is processed to obtain a powder containing titanium dioxide, an element of d-block and an element of p-block. The powder can be heat-treated, annealed at a temperature between 400° C. and 800° C., preferably at a temperature around 700° C. Treatment may also involve filtration and rinsing with distilled water to remove sulfur and ammonium ions. Optionally, the powder may be pulverized to form fine-grained granules. Preferably, the size of the granules is smaller than or equal to 20 µm or about 20 µm. In one embodiment the photocatalyst consists of granules less of equal of 20 µm or approximately 20 µm.

In an example of the method according to the invention, the mixture is a homogeneous solution and the treatment involves the following steps:
  stirring of the homogeneous solution
  addition of alkaline medium, preferably $NH_3$ solution, to obtain a pH higher than the pH of the solution
  maturation of the gel with stirring or static
  separation of the gel using centrifugal or filtration to obtain powder
  washing the powder
  drying the powder
  pulverizing the powder into small size granules, for example by crushing, grinding, ball-milling
  heat treatment of powder.

Examples of impurities in titanium dioxide formations, which make the photocatalyst active, are manganese, cobalt, iron, chromium from d-block of the periodic table and indium, aluminum from p-block of the periodic table. Titanium dioxide formations may contain more than two impurities. The photocatalyst produced is a material with a number of oxidative states, since aluminum and indium have an oxidative state of 3+, manganese, cobalt, iron and chromium have an oxidative state of 2+ and titanium 4+.

An example of a photocatalyst of the invention is a multi-element catalyst with manganese-metallic transition metal of the d-block of the periodic table—and aluminum-element of the p-block of the periodic table—at different concentrations of impurities. The photocatalyst is activated both in the presence of artificial light and in sunlight. Titania, i.e. $TiO_2$, manganese and aluminum interact cooperatively and provide a photocatalyst, improved over the hitherto known after exposure to natural sunlight. The addition of manganese and aluminum leads to a drastic improvement in the photocatalytic activity of the final multi-element catalyst under solar radiation compared to the known photocatalysts.

Other examples of photocatalysts with titanium dioxide formations have impurities from Co—Al, Fe—Al, Cr—Al, In—Mn, In—Fe, In—Cr or other combinations.

Indicatively, the sum of the atomic ratio of the element of the d-block of the periodic table and titanium and the atomic ratio of the element of the p-block of the periodic table and titanium is less than or equal to 10:100 or about 10:100. In case of a photocatalyst with manganese and aluminum impurities, the sum of the atomic ratio of aluminum to titanium and the atomic ratio of manganese to titanium is less than or equal to 10:100 or about to 10:100, preferably less than or equal to 4:100 or about 4:100. In one example the atomic ratios of the two impurities with respect to titanium are equal. At concentrations less than 1% the impurities may be pure metals that replace titanium atoms and at high concentrations the minerals may be present in the form of oxides, e.g. manganese oxide.

Photocatalysts according to the invention are activated by solar or artificial ultraviolet/visible radiation. Some catalyst samples absorb 20%-25% of the radiation with a wavelength of 450 nm-500 nm.

Photocatalysts according to the invention can be integrated into a substrate or immobilized on a solid/polymeric/paper/cloth surface or on a solid/polymeric/paper/cloth body.

Protecting the environment and public health necessitate the comprehensive and efficient treatment of water and wastewater, as required by European legislation. The photocatalysts of the invention are activated in the presence of solar radiation and inactivate bacteria resistant to antibiotics (ABs) and microorganisms with different levels of resistance to stressful disinfection conditions, remove correspondingly degrading residual water resistance genes (RGs) and decompose antibiotics from waste-water, effluent and other liquid wastes. The presence of antibiotics and resistance genes in the environment raises serious concerns for the protection of public health, as their widespread dispersal in the aquatic environment and liquid waste has already been recorded.

Photocatalysts of the invention are multi-functional and can be used in environmental processes such as photocatalytic decomposition of organic and inorganic pollutants and in antibacterial/antimicrobial activity. The interaction of their ingredients make the multi-element catalyst suitable for photocatalytic decomposition applications of a number of pollutants in water (azo dyes, phenols, pesticides), in air (nitrogen oxides, aromatic hydrocarbons) and for the disinfection from Gram-positive and Gram-negative bacteria such as *E-coli*, enterococci, etc., as well as other microorganisms.

The activity of a photocatalyst, according to the invention, under sunlight and artificial visible light makes it suitable for applications both indoors and outdoors. They have already been implemented in a pilot system for water and wastewater treatment, which makes them suitable for use and use in small settlements, hotel units, swimming pools and health centers. They can also be used in powder form on surface coatings for outdoor or indoor use in buildings for air purification in urban and industrial areas.

Examples of invention are described with reference to FIGS. 1 to 17, whereby:

FIG. 1 shows the method of preparing a photocatalytic material according to the invention FIG. 2 shows the discoloration of methylene blue in an aqueous solution in the presence of a photocatalyst that has been heat treated at 700° C., when exposed to ultraviolet (UV) radiation FIG. 3 shows the discoloration of methylene blue in aqueous solution in the presence of the photocatalyst that has been heat treated at 400° C., when exposed to ultraviolet (UV) radiation FIG. 4 shows the discoloration of methylene blue in an aqueous solution in the presence of the photocatalyst undergoing heat treatment at 700° C., when exposed to visible radiation.

FIG. 5 shows the discoloration of methylene blue in aqueous solution in the presence of the photocatalyst that has been heat treated at 400° C., when exposed to visible radiation.

FIG. 6 presents comparatively the activity of a photocatalyst according to the invention of a well-known photocatalyst under ultraviolet (UV) radiation FIG. 7 presents comparatively the activity of a photocatalyst according to the invention of well-known photocatalysts under visible radiation FIG. 8 shows an example of photocatalyst activity in disinfecting the *Escherichia coli* bacterium under sunlight FIG. 9 shows an example of the activity of the photocatalyst in comparison with the commercial material P25 in the disinfection of the bacterium *Enterococcus* under sunlight FIG. 10 shows an example of the structural characterization of a multi-element catalyst according to the invention at different concentrations and proportions of impurities that have undergone heat treatment at 700° C.

Figure 15:
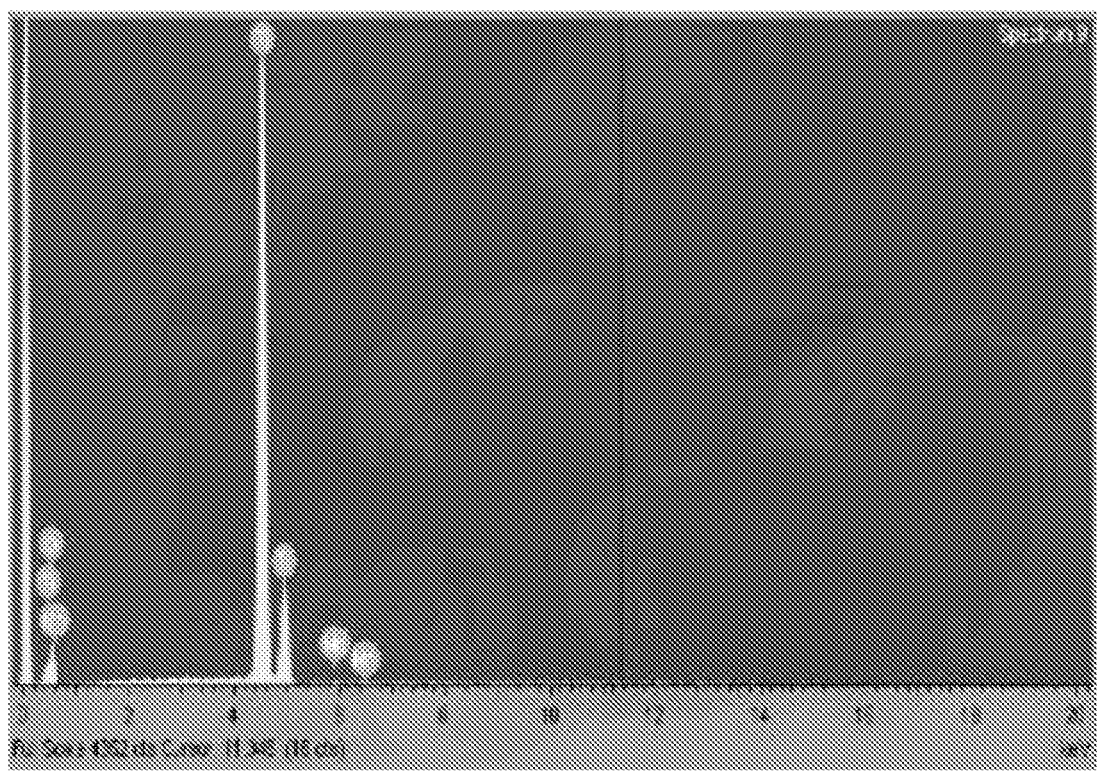
Figure 16:
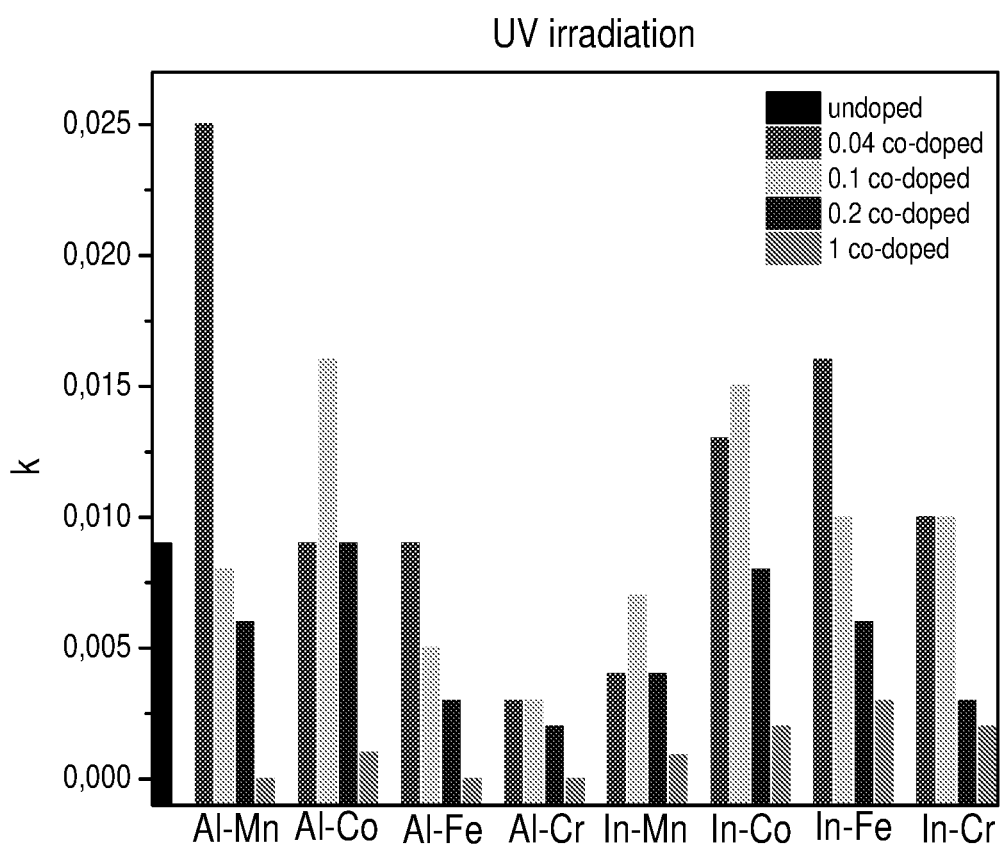
Figure 17:
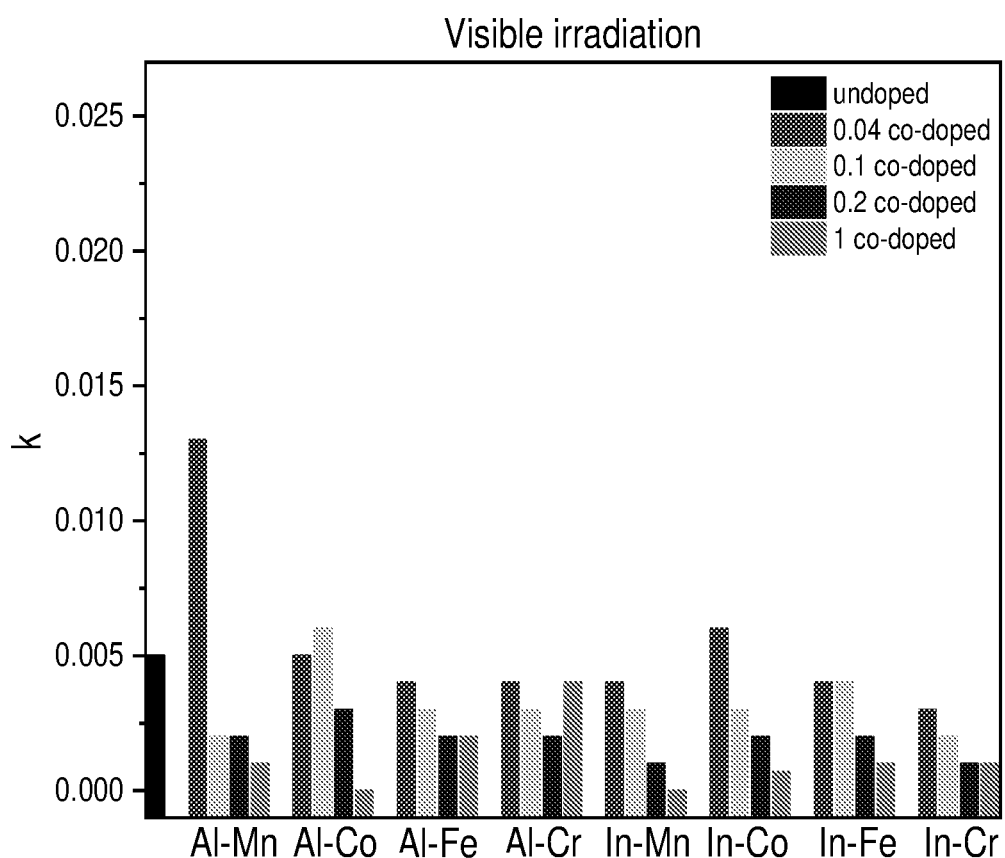

FIG. 15 presents an example of an Energy-Dispersive X-ray Spectroscopy (EDS) analysis of a multi-element catalyst, according to the invention under 700° C. heat treatment FIG. 16 shows the reaction rate constant k for photocatalytic degradation under ultraviolet radiation for a number of different multi-element catalysts and different concentrations FIG. 17 shows the reaction rate constant k for photocatalytic degradation under visible radiation for a number of different multi-element catalysts and different concentrations In the Figures and description, when reference is made to a ratio of one or more elements to $TiO_2$, the number indicates the ratio of the atoms or the numerator to the titanium atoms, e.g. 0.04 Al/$TiO_2$ indicates an atomic ratio of Al to Ti atoms equal to 0.04 and 0.04 (Al—Mn)/$TiO_2$ indicates an atomic ratio of Al and Mn atoms to Ti atoms equal to 0.04. Also, the ratio of atoms to the impurities, i.e. the admixtures, is indicated by the ratio of the atomic ratio of each admixture to the titanium, e.g. Al/Mn 0.1:0.1, denotes an Al ratio of atoms with respect to Ti atoms equal to 0.1 and a ratio of Mn atoms relative to Ti atoms equal to 0.1. The atomic ratio is referred to as a decimal number or % (concentration).

An embodiment of the invention, i.e. a photocatalytic material, which is titanium dioxide with a mixture of manganese and aluminum, was prepared from a mixture produced by the concatenation, i.e. co-precipitation, of manganese and aluminum in a titanium solution. An illustrative example of a method of invention using titanium sulphate includes the following steps (reference signs in bold refer to FIG. 1):

providing a titanium sulphate solution, Titanium (II) Sulfate ($TiSO_4$)

adding manganese and aluminum solutions to the titanium sulphate solution, so as to obtain a mixture 1, stirring 2 of the mixture at room temperature for a period of between 2 and 24 hours, preferably for 3 hours adding 3 an alkaline solution, e.g. ammonia $NH_4OH$, $NH_3$, NaOH, to obtain a gel with a pH between 6 and 10, preferably between 6 and 8 stirring 4 the gel for a period of 12 to 48 hours, preferably about 24 hours to mature separation 5 of the gel using a centrifuge or by filtering to obtain powder rinsing 6 the powder with distilled water until the sulfur and ammonium ions are completely or almost completely removed drying 7 the powder pulverizing 8 the powder for example by crushing, ball-milling grinding etc., until fine-grained granules are obtained, e.g. with granule size less or equal than 20 μm, and heat treatment, annealing 9 of the powder at a temperature ranging from 400° C. to 800° C., indicative about 700° C.

The process mentioned above is just one example of the invention. For example, other titanium sources can be used, e.g. titanium isopropoxide, titanium butoxide, or any other titanium solution. Also, instead of an aluminum solution and a manganese solution, other solutions can be used, a solution of a metal element of d-block and a solution of a metal element of p-block of the periodic table. In the example above, the concentration of aluminum in the aluminum solution is from about 0.01 M to about 10 M, preferably less than about 0.1 M. and the concentration of manganese in the manganese solution is from about 0.01 M to about 10 M, preferably less than about 0.1 M or about 0.1 M. Indicative only, the value of the concentration of nitric aluminum solution and the solution of acetic manganese solution is 0.1 M or about 0.1 M.

Figure 1:
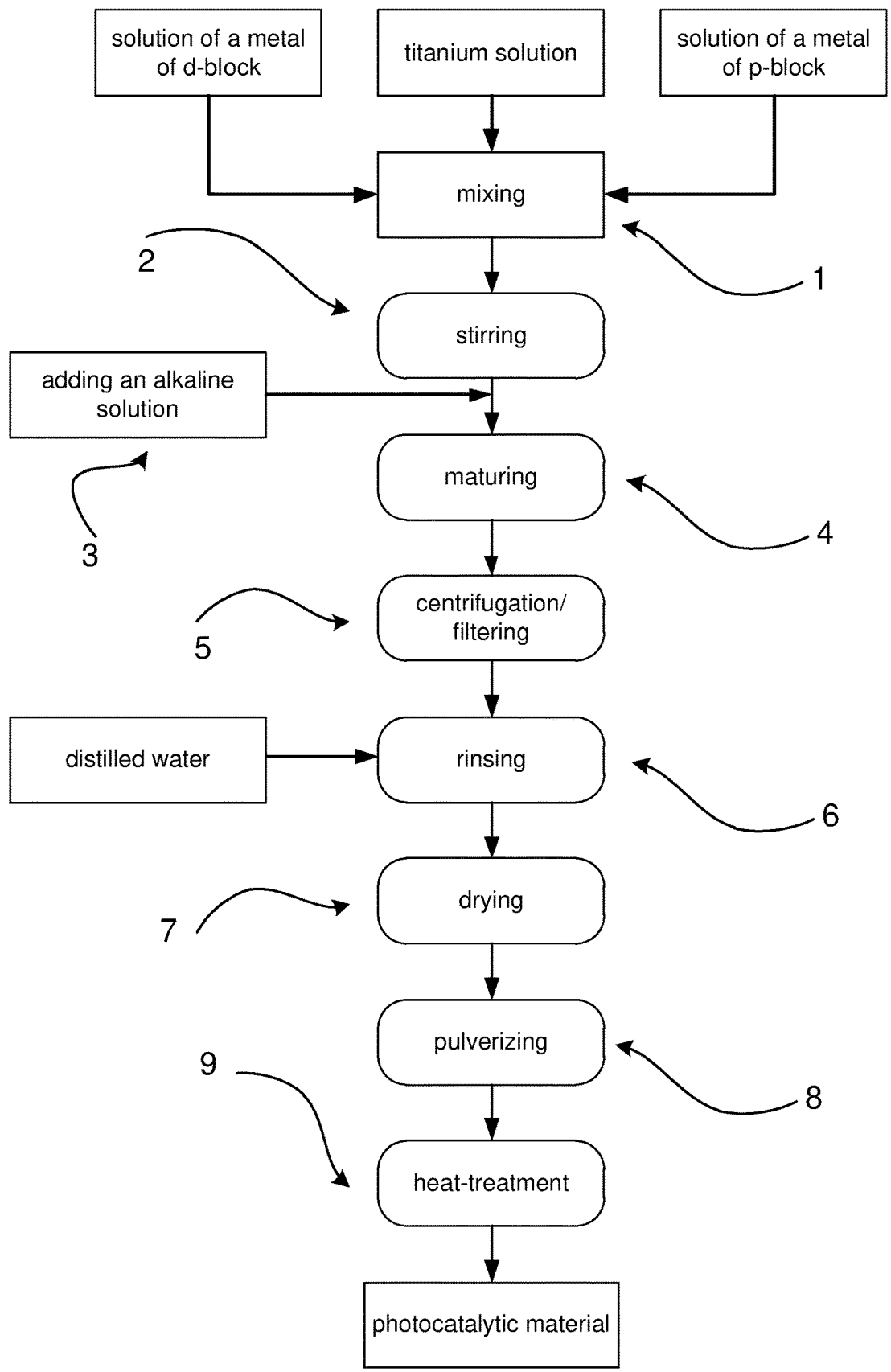

The above example of the invention method is presented schematically in FIG. 1.

The final product is in the form of powder or granules and is prepared by a method based on concatenation. Photocatalytic material, according to the invention, is a multi-element catalyst with transition metals from d-block of the periodic table, e.g. manganese, cobalt, iron, chromium, and a metal element of p-block of the periodic table, e.g. indium, aluminum at different concentrations and mixing ratios in the titanium oxide (titania). The impurities may be pure metals, in particular, when the concentration is less than 1%, that replace titanium and at higher concentrations the minerals or oxides, e.g. manganese oxide, in particular, when the concentration is higher than 1%.

In some examples of the invention the transition metal of d-block is manganese. In some other examples of the invention the element of the p-block of the periodic table is aluminum. Preferably the d-block transition metal is manganese and the p-block element of the periodic table is aluminum.

Figure 10:
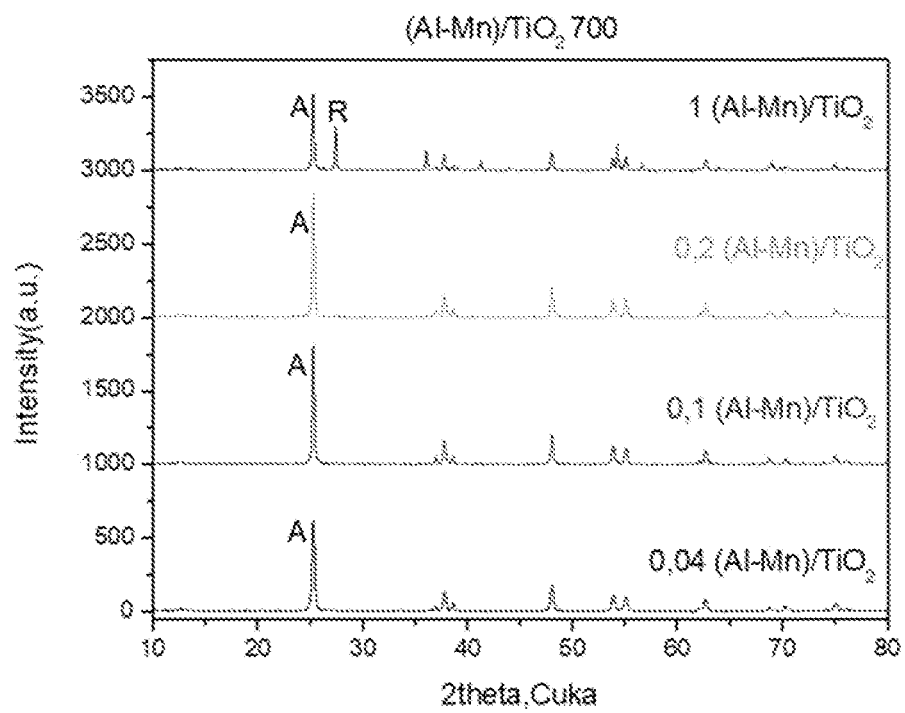
Figure 11:
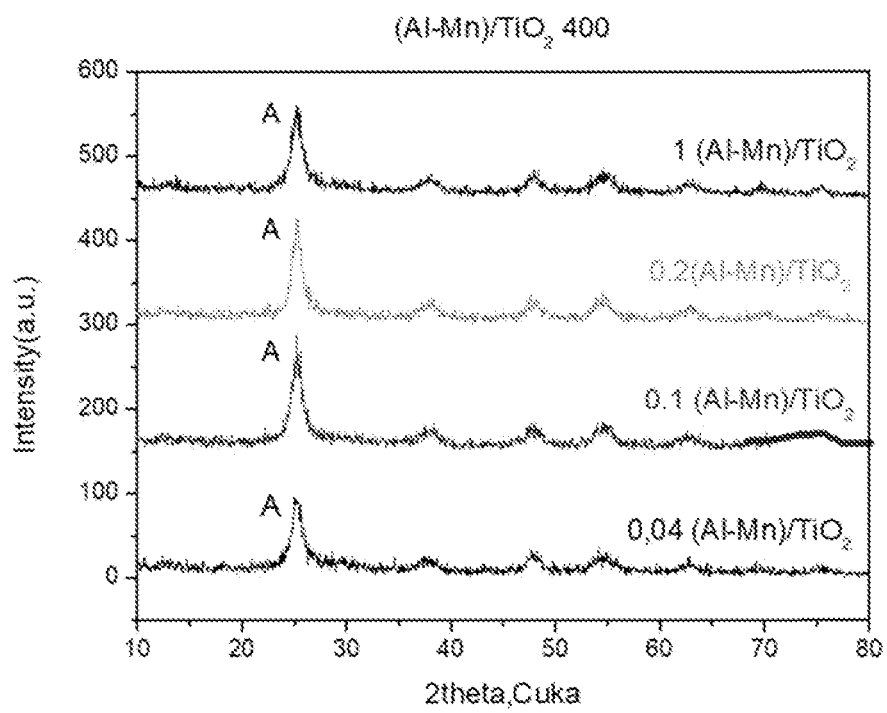
FIG. 11 shows an example of the structural characterization of a multi-element catalyst, according to the invention at different concentrations and proportions of impurities that have been heat treated at 400° C.

FIG. 10 and FIG. 11 show the structural characterization of a sample of multi-element catalysts according to the invention in different concentrations and proportions of impurities, which have undergone heat treatment at 400° C. (FIG. 11) and at 700° C. (FIG. 10). FIG. 10 shows that at low concentrations, the anatase structure is favored, while at high concentrations we have a mixture of anatase/rutile without the presence of peaks that correspond to oxides of aluminum or manganese respectively. FIG. 11 shows that heat treatment at low temperatures leads to the presence of materials with anatase structure which show wide peaks that indicate that the material has not crystallized at that temperature.

Figure 12:
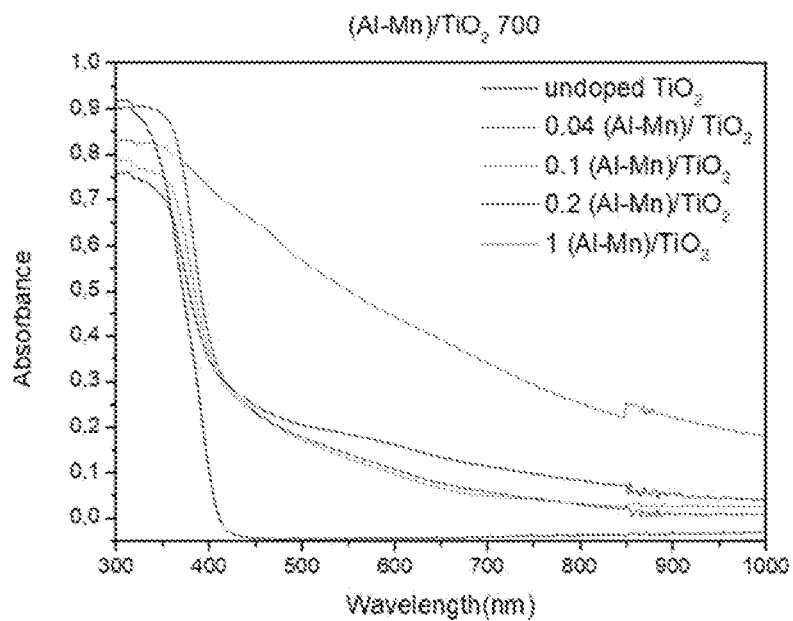
FIG. 12 shows the optical characterization—absorption of light—of a multi-element catalyst according to the invention at different concentrations and proportions of impurities that have been heat treated at 700° C.
Figure 13:
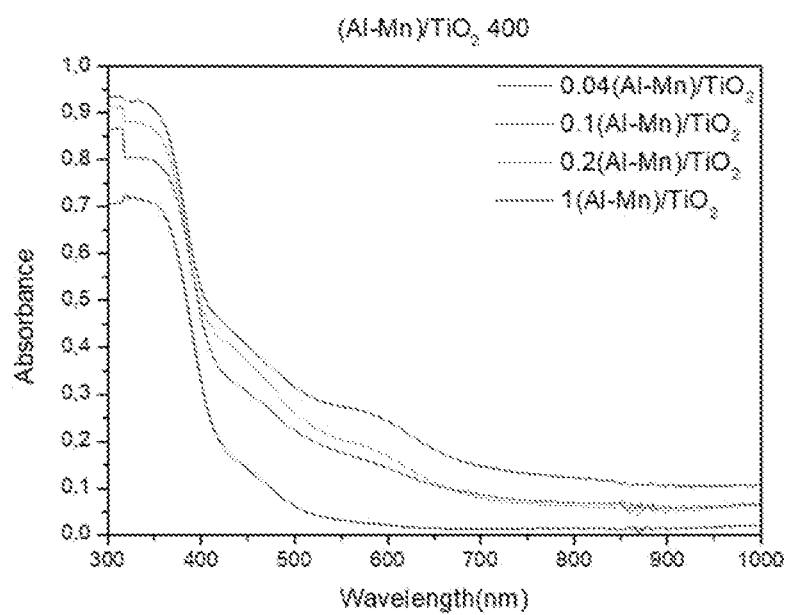
FIG. 13 shows the optical characterization—absorption of light—of a multi-element catalyst according to the invention at different concentrations and proportions of impurities undergone heat treatment at 400° C.

Respectively, FIG. 12 and FIG. 13 show the optical characterization-light absorption—of an example of multi-element catalysts according to the invention in different concentrations and proportions of impurities, which underwent annealing/heat treatment during their production at 400° C. (FIG. 13) and at 700° C. (FIG. 12). In both cases it is easy to see that we have an increase in absorption in the area of visible 400 nm-800 nm, which indicates an introduction of the admixtures in the structure of titania.

Figure 14:
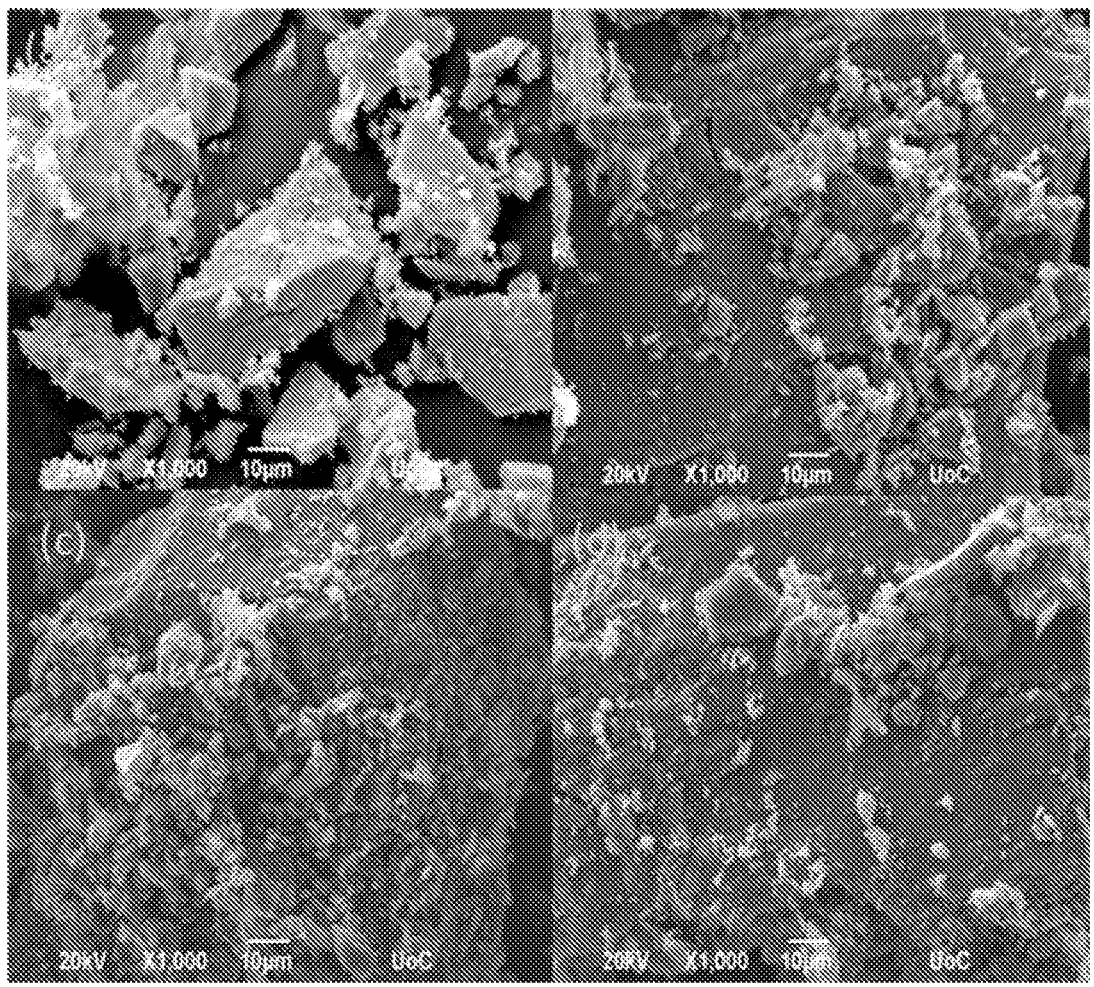
FIG. 14 shows images of Scanning Electron Microscopy (SEM-scanning electron microscope) of multi-element catalysts in different concentrations and proportions of impurities undergone heat treatment at 700° C.

FIG. 14 shows indicative images of SEM multi-element catalysts, granules and aggregates, at different concentrations and proportions of impurities under heat treatment at 700° C., before pulverizing.

FIG. 15 presents an EDS (Energy Dispersive Spectroscopy) elemental analysis of a multi-element catalyst, according to the invention for an indicative material with a 1% mixing concentration.

The photocatalyst produced according to the invention, is a material that may have various oxidative states, since aluminum has an oxidative state of $3^+$, manganese $2^+$ and titanium $4^+$.

FIG. 16 and FIG. 17 show the reaction rate constant k of photocatalytic reactions under ultraviolet radiation (FIG. 16) and under visible radiation (FIG. 17) for a number of different multi-element catalysts and different mixing concentrations. For each catalyst, the constant k is presented for atomic ratios of 0.04, 0.1, 0.2 and 1 in this order. The first bar to left shows the reaction rate constant k for the undoped catalyst. As can be seen from FIG. 16 and FIG. 17, the effectiveness of photocatalytic reactions depends on both the impurities and their concentrations on the photocatalyst, with the most effective combination for the examples of these Figures being the combination of manganese and aluminum impurities with atomic ratio Mn/Al:Ti equal to 0.04. Other combinations that have very good efficiency in ultraviolet and visible light are by mixing Al and Co with atomic ratios to titanium equal with 0.1 or In and Co with atomic ratios to titanium equal to 0.04. Combinations are also presented with excellent performance in ultraviolet or visible light, such as In with Fe or In with Cr.

An example of photocatalyst according to the invention contains titanium, manganese and aluminum. Manganese acts equally as an impurity and as a photosensitizer.

The photocatalyst is activated in the presence of sunlight or artificial light and is capable of breaking down organic and inorganic pollutants. For example, the photocatalyst can be used to decompose volatile organic compounds (VOCs) such as acetaldehyde ($CH_3CHO$), formaldehyde ($CH_2O$), benzene, toluene, etc. and volatile inorganic compounds such as $NO_x$, $CO_2$ in the presence of UV, visible and sunlight. In general, the photocatalyst can be used as received or incorporated into a structural material matrix (e.g. concrete, cement, mortar, putty, paint, etc.) or immobilized on or inside a solid surface (e.g. metal, wood, plastic, glass, cloth, fabric, paper, etc. The photocatalyst can be further used for air, water or liquid waste decontamination.

Figure 2:
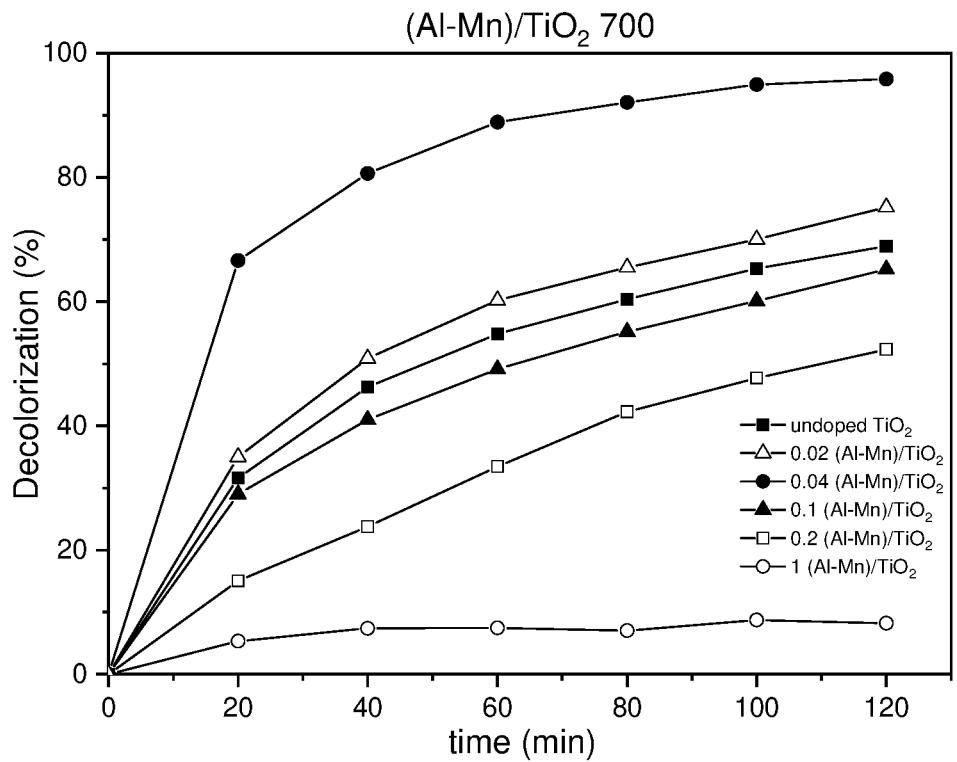
Figure 3:
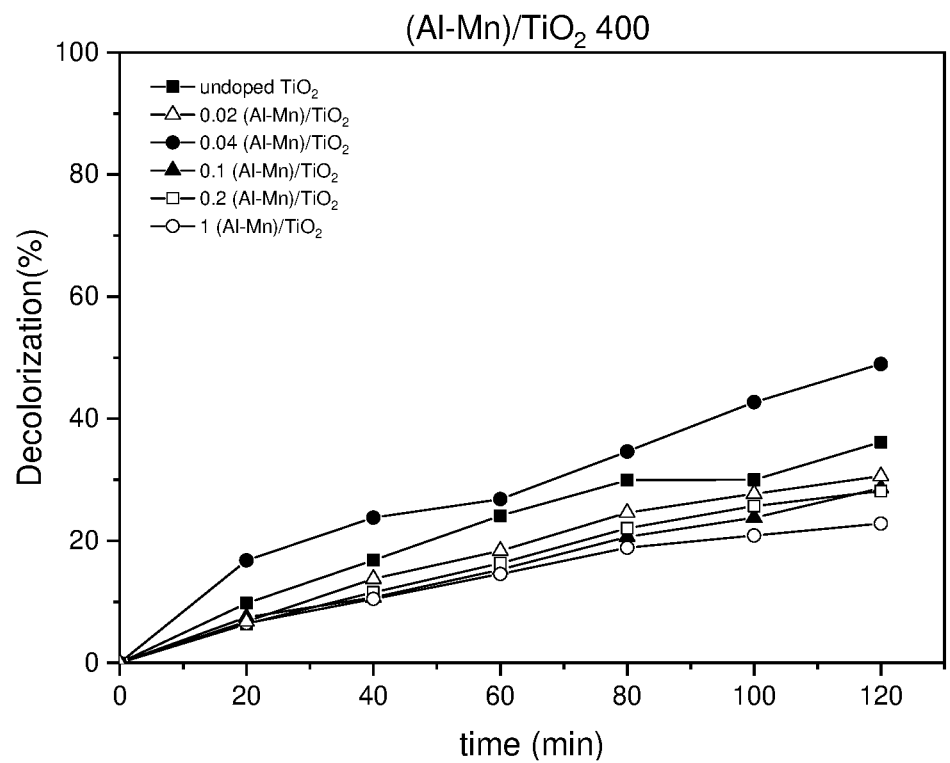
Figure 4:
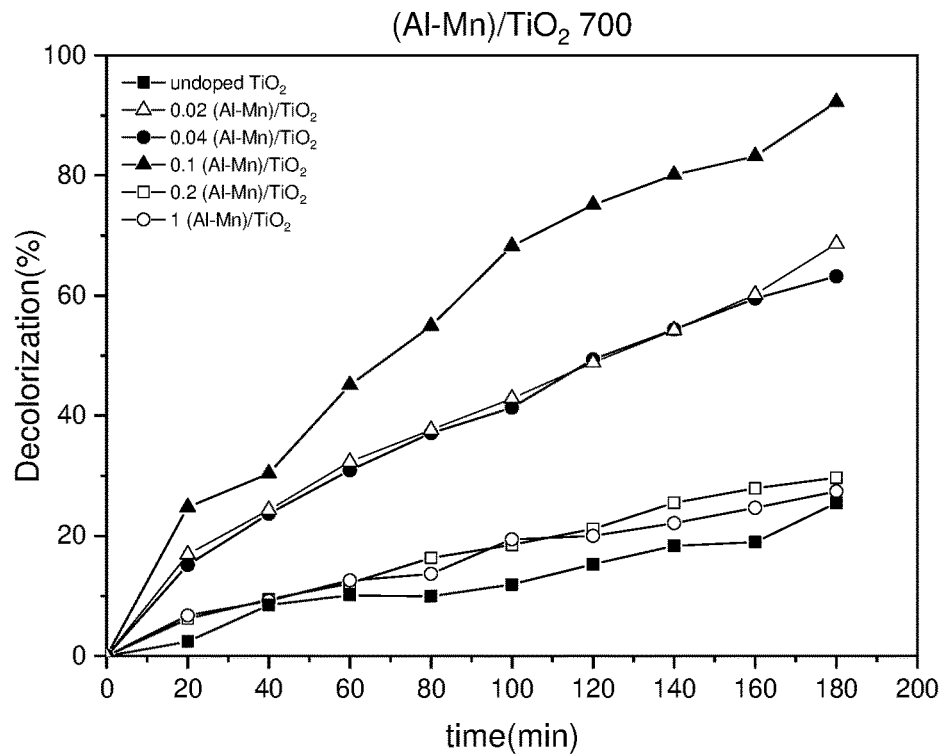
Figure 5:
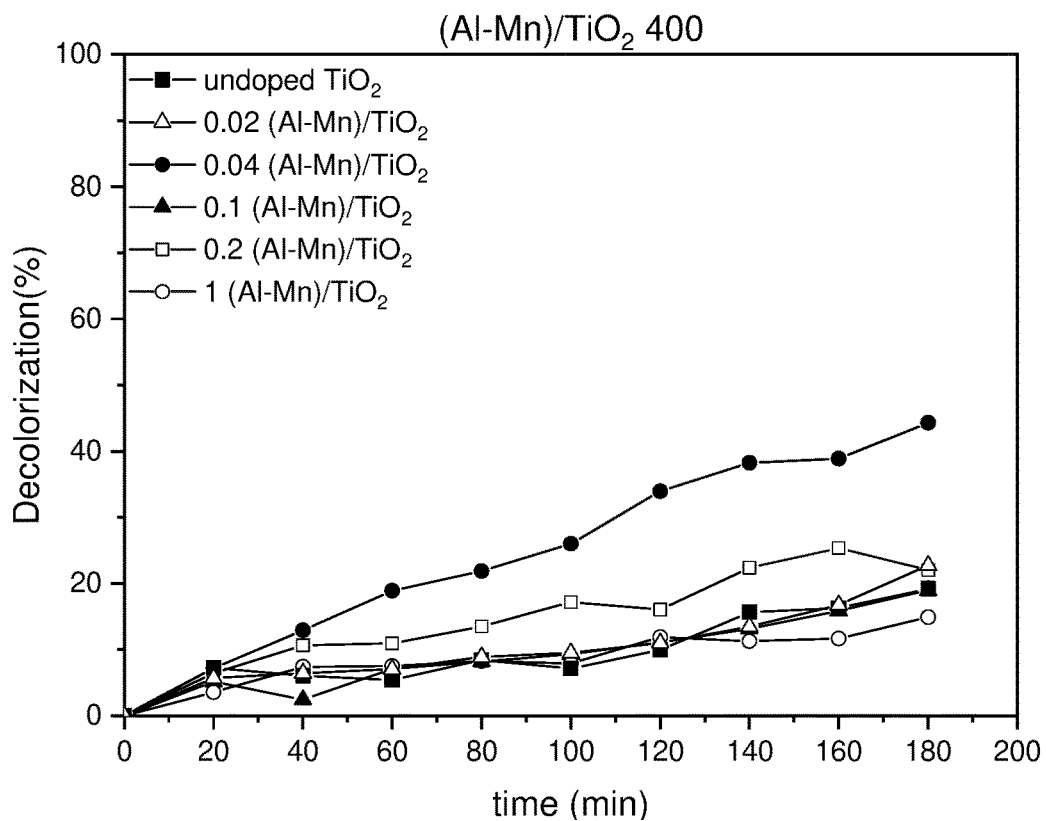

FIG. 2 to FIG. 5 show the results of methylene blue discoloration experiments in aqueous solution in the presence of a photocatalyst based on ISO—ISO 10678:2010—Determination of photocatalytic activity of surfaces in an aqueous medium by degradation of methylene blue (MB)—subjected to heat treatment at 700° C. (FIG. 2 and FIG. 4), or 400° C. (FIG. 3 and FIG. 5), when exposed to ultraviolet (UV) or visible radiation. The photocatalyst used was titanium dioxide with a mixture of manganese and aluminium with atomic ratio-Al—Mn: Ti between 0.01 and 1. FIG. 2 shows the photocatalytic activity of photocatalysts that have been heat treated at 700° C. during UV exposure, with the material showing the best photocatalytic activity of >90% MB degradation by those with atomic ratio of 0.04. Correspondingly, FIG. 4 shows the photocatalytic activity of photocatalysts that have been heat treated at 700° C., during exposure to visible (Vis) radiation, with the material showing the best photocatalytic activity of >90% MB degradation by those with atomic ratio of 0.04.

Figure 8:
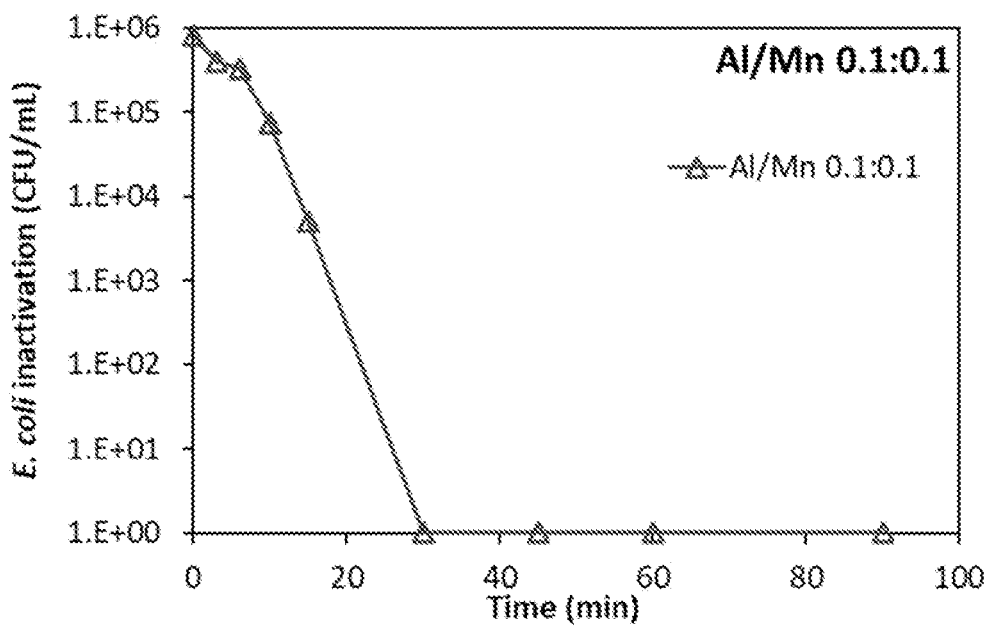
Figure 9:
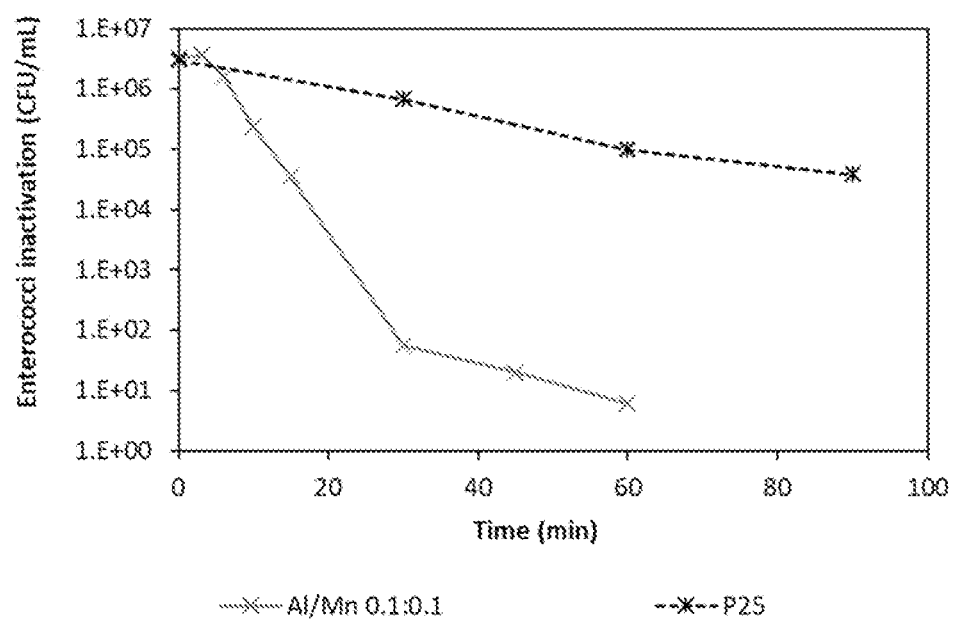

FIG. 8 shows the decomposition time of the bacterium *E. coli* inactivation after exposure to sunlight in the presence of a multi-element photocatalyst with an atomic ratio of aluminum to manganese of 1:1. FIG. 9 shows the time of degradation of Enterococci inactivation after exposure to sunlight in the presence of the same multi-element photocatalyst shown in FIG. 8, compared to the known commercial photocatalyst P25. As it is easily understood, the multi-element photocatalyst is much more active than the corresponding commercial one.

The application of examples of photocatalysts of the invention based on titania—multi-element co-doped titanium dioxide-show a catalyst high activity, e.g. decomposing a number of pollutants in water (azo dyes, phenols, pesticides), in the air (nitrogen oxides, aromatic hydrocarbons) and has significant activity in disinfecting and destroying bacteria (*E-coli*, Enterococci, etc.) and other microorganisms.

Figure 6:
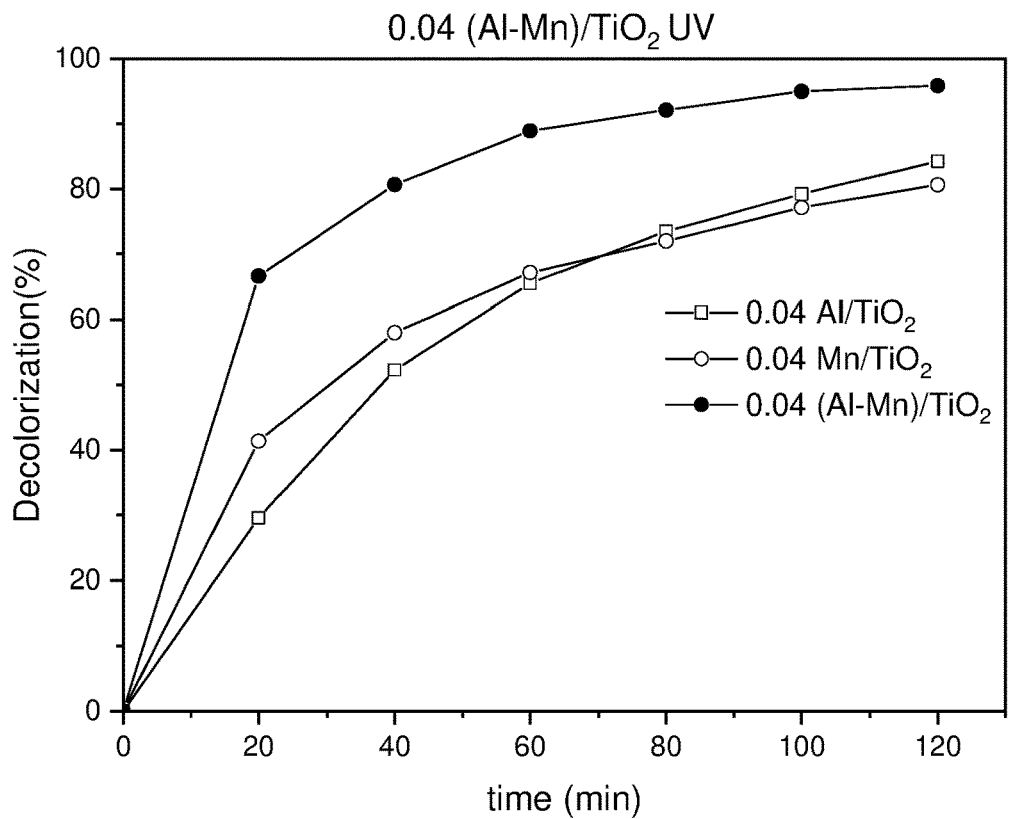
Figure 7:
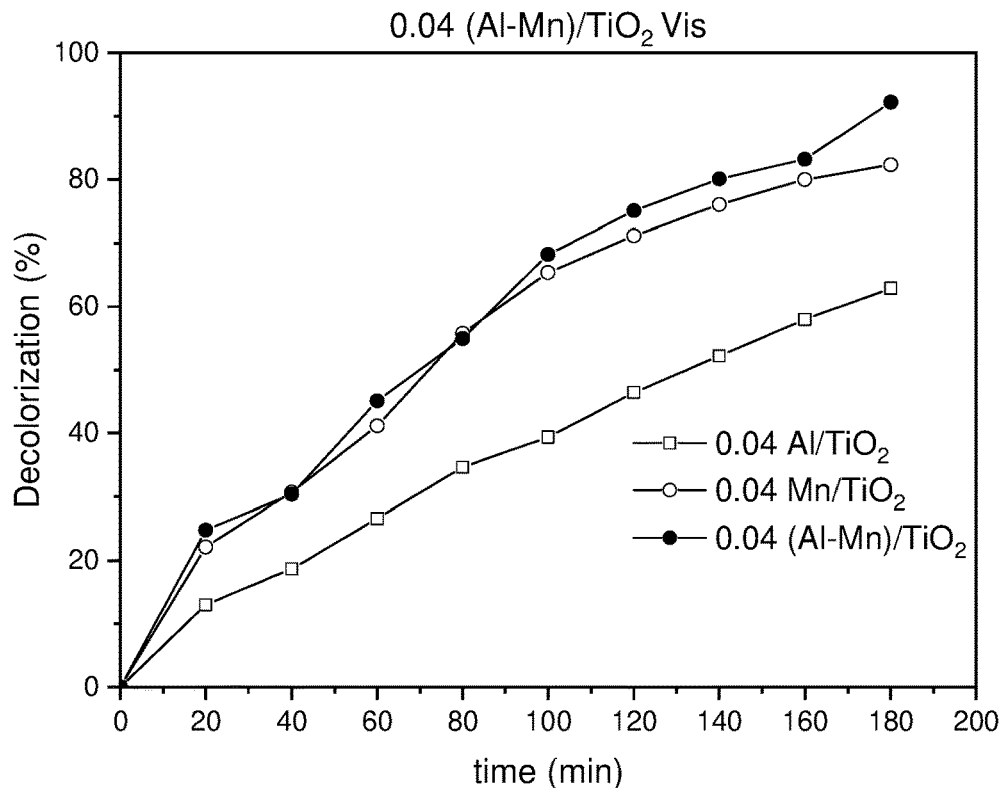

The presence of manganese and aluminum leads to a drastic improvement in the photocatalytic activity of the final multi-element catalyst under solar radiation in relation to materials containing only manganese or only aluminum impurity, i.e. admixture, as shown in FIG. 6 and FIG. 7. In these Figures, all three catalysts have the same atomic ratio, equal to 0.04, of impurities to titania. Their activity under sunlight makes them particularly suitable for outdoor applications. They can be used e.g. for water purification and in powder form in surface coatings for external use.

The invention claimed is:

1. Method of production of a photocatalyst that includes (a) preparation of a mixture including titanium and elements or compounds, whereby the elements or compounds include i) at least one metal element of d-block of the periodic table or a compound of a metal element of d-block of the periodic table and ii) at least one metal element of p-block of the periodic table or a compound of a metal element of p-block of the periodic table, (b) treatment of the mixture after the addition of said elements or compounds and (c) obtaining the photocatalyst containing titanium dioxide and at least one metal element of d-block of the periodic table and at least one metal element of p-block of the periodic table, whereby the mixture is prepared from a titanium solution, a solution of a metal element of d-block of the periodic table, the element of d-block within the solution of the metal element of d-block having a concentration within a range of 0.01 M to 0.1 M, and/or a solution of metal element of p-block of the periodic table, the element of p-block within the solution of the metal element of p-block the having a concentration within a range of 0.01 M to 0.1 M.

2. Method according to claim 1, whereby the mixture includes a solution of an aluminum salt solution and a manganese salt solution.

3. Method according to claim 2, whereby the mixture includes a solution of aluminum nitrate or/and a solution of acetic manganese, a solution of aluminum nitrate and a solution of acetic manganese.

4. Method according to claim 1, whereby the treatment of the mixture includes production of powder and annealing of the powder in a temperature within a range of 400° C. to 800° C.

5. Method of production of a photocatalyst that includes (a) preparation of a mixture including titanium and elements or compounds, whereby the elements or compounds include i) at least one metal element of d-block of the periodic table or a compound of a metal element of d-block of the periodic table and ii) at least one metal element of p-block of the periodic table or a compound of a metal element of p-block of the periodic table, (b) treatment of the mixture after the addition of said elements or compounds and (c) obtaining the photocatalyst containing titanium dioxide and at least one metal element of d-block of the periodic table and at least one metal element of p-block of the periodic table, whereby the mixture is prepared from a titanium solution, a solution of a metal element of d-block, having a concentration within a range of 0.01 M to 0.1 M, and/or a solution of metal element of p-block of the periodic table, the element of p-block within the solution of the metal element of p-block the having a concentration within a range of 0.01 M to 0.1 M, whereby the treatment of the mixture includes production of powder, and its subsequent drying and pulverization.

6. Method according to claim 5, whereby the mixture is a homogenous solution and the method includes the following steps:
stirring of the homogeneous solution,
adding an alkaline medium to obtain a gel with a pH higher than the pH of the homogeneous solution,
maturation of the gel,
separation of the gel to obtain powder,
washing the powder,
heat treatment of the powder.

7. Photocatalyst in the form of granules, which have titanium dioxide formations with impurities of a metal element of d-block of the periodic table and impurities of a metal element of the p-block of the periodic table, whereby the element of d-block is manganese and the element of p-block is aluminum and whereby the sum of the atomic ratio of manganese and titanium and the atomic ratio of aluminum and titanium is equal or less than 4:100 or about 4:100.

8. Photocatalyst according to claim 7, consisting of granules with a granule size less or equal than about 20 μm.

9. Photocatalyst according to claim 7, whereby the impurity of the element of d-block of the periodic table is in the form of pure element and/or the impurity of the element of p-block of the periodic table is in the form of pure element.

10. Photocatalyst according to claim 7, whereby the impurity of the element of d-block of the periodic table is in the form of an oxide and/or the impurity of the element of p-block of the periodic table is in the form of an oxide.

11. Photocatalyst according to claim 7, which absorbs 20%-25% of incident radiation with a wavelength between 450 and 500 nm.

12. Photocatalyst according to claim 7 embodied in a substrate or applied on a surface of a solid.

13. Method to activate a photocatalyst according to claim 12 with solar or artificial ultraviolet or visible radiation.

* * * * *